[19] United States Patent
Chang et al.

[11] Patent Number: 4,895,832
[45] Date of Patent: Jan. 23, 1990

[54] COPRECIPITATION METHOD FOR PRODUCING SUPERCONDUCTING OXIDES OF HIGH HOMOGENEITY

[75] Inventors: Chau-Ting Chang; Ru-Shi Liu, both of Hsinchu, Taiwan

[73] Assignee: Industrial Technology Research Institute, Hsinchu, Taiwan

[21] Appl. No.: 266,786

[22] Filed: Nov. 3, 1988

[51] Int. Cl.$^4$ .................. C01F 11/02; C01F 17/00; C01G 3/02
[52] U.S. Cl. ........................... 505/1; 423/263; 423/265; 423/593; 423/604; 501/123; 501/152; 502/355; 502/525; 252/521; 505/737; 505/738; 505/780
[58] Field of Search .................. 423/593, 593 C, 604, 423/263, 265; 501/123, 152; 502/355, 525; 505/1, 737, 738, 780; 252/521

[56] References Cited
FOREIGN PATENT DOCUMENTS
85/5142  1/1986  South Africa .

OTHER PUBLICATIONS
Kawai et al., "Preparation of High–Tc Y–Ba–Cu–O Superconductor", Japanese Journal of Applied Physics, vol. 26, No. 5, May, 1987, pp. 1736–1737.
Liu et al., "Preparation of High Tc Superconducting Powders of $Y_1B_2Cu_3O_{7-x}$ by Homogeneous Coprecipitation", MRS, Apr. 1988.
Voigt et al., "A hydroxycarbonate Route to Superconductor Precursor Powders", Mat. Res. Soc. Symp. Proc., vol. 99, 1988, pp. 635–638.
Ye et al., "High–Tc Y:Ba:Cu:O Superconductors Synthesized By Various Pre-Solgel Techniques", MRS. Apr. 5, 1988.
Fujiki et al., "Preparation of a High–Tc Y–Ba–Cu–O Superconductor Using Colloidal Methods", Japanese Journal of Applied Physics, vol. 26, Jul. 1987, pp. 1159–1160.

Primary Examiner—Robert L. Stoll
Assistant Examiner—Paige C. Harvey
Attorney, Agent, or Firm—Ladas & Parry

[57] ABSTRACT

A homogenous coprecipitation method by which superconducting oxides having perovskite-like structure, such as YBa2Cu3O7-x, can be produced in mass, in which urea is used as solvent to adjust and control the PH value of an aqueous nitrate solution. The coprecipitation method of this invention comprises following steps: (a) preparing an aqueous mixture containing Y, Ba and Cu salts with molar ratio of 1:2:3 wherein Y being 0.068M; (b) adding 5–10 moles of oxalic acid per one mole of Y and 20–250 moles of urea per moles of Y into the aqueous mixture; (c) heating the aqueous mixture to a temperature range of 80° to 100° C. to proceed a hydrolysis of the urea such that PH value of the aqueous mixture will be gradually elevated by $NH_3$ gas evoluted from the urea hydrolysis; and (d) cooling the temperature of the aqueous mixture to room temperature at which time a desired uniform PH value is reached. After cooling, pale blue homogeneous coprecipitates of the superconducting oxides can be obtained.

4 Claims, 4 Drawing Sheets

COPRECIPITATION METHOD FOR PRODUCING SUPERCONDUCTING OXIDES OF HIGH HOMOGENEITY

BACKGROUND OF THE INVENTION

1. Field of the Invention

This invention relates to a coprecipitation method for producing high transition temperature (Tc) powdered superconducting oxides, such as YBa2Cu3O7-x, and more particularly to a coprecipatation method by which superconducting powders of Y-Ba-Cu-O with a high degree of homogeneity can be mass produced.

2. Description of the Prior Art

Hitherto, in general, three major methods of producing powdered oxide superconductors which have higher transition temperatures have been developed, namely, the solid-state reaction method, alcoholate processing method, and coprecipitation method. By using the solid-state reaction method, a series of laborious cycles of heating and grinding to metal oxides or carbonates as starting materials, have to be processed, and the compositional inhomogeneity of the final obtained powders can not be avoided. In the alcoholate processing method, starting materials, such as Yttrium (Y), Barium (Ba), and Copper (Cu) alcoholates, have been treated by a serious of processes, i.e. mixing, hydorlysis, drying, grinding, roasting, and sintering, etc., so as to obtain the superconducting powders. However, due to the difficulties of the preparation of the starting materials and the expensive cost of the starting materials, it is not suitable for mass production. In order to reduce the production cost and to obtain better controlled stoichometry so as to inturn obtain a higher homogeneity, the coprecipitation method has been employed by various workers. The most known coprecipitation method uses oxalate ions as precipitants in the aqueous Yttrium (Y), Barium (Ba), and Copper (Cu) nitrates solution, and uses potassium hydroxide (KOH) to adjust the PH value of the solution thereby causing coprecipitation of Y, Ba, and Cu. However, there are still some disadvantages in the known coprecipitation method, such as the fact that the homogeneity of the precipitated powders is not as satisfied as expected due to a locally uneven distribution of PH value was made by the KOH in instaneousness. A part of superconductivity might be lost in the precipitated powders since a possible contamination of potassium ions, and undesirable stoichiometry can not be avoided.

SUMMARY OF THE INVENTION

In accordance with the present invention, urea is adapted to replace the role of KOH and thus dissolved together with other reactants. Upon heating to a temperature range between 80°-100° C., urea will decompose into $CO_2$ and $NH_3$ based on the following hydrolysis equation:

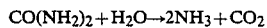

$$CO(NH_2)_2 + H_2O \rightarrow 2NH_3 + CO_2$$

Therefore, the $NH_3$ will gradually elevate the PH value throughout the solution making it possible to obtain a higher homogeneity of coprecipitates. Besides, the simultaneous evolution of $CO_2$ has the advantage of being able to prevent undesirable bumping, during digestion.

The present invention provides a coprecipitation method for producing superconducting oxides with high degree of homogeneity which comprises the following steps of: (a) preparing an aqueous mixture containing Y, Ba and Cu salts with molar ratio of 1:2:3; (b) adding 5-10 mole of oxalic acid per mole of Y and 20-250 mole of urea per mole of Y into the aqueous mixture; (c) heating the aqueous mixture to a temperature range of 80 to 100 degrees to proceed a hydrolysis of the urea such that PH value of the aqueous mixture will be gradually elevated by $NH_3$ evoluted from the urea hydrolysis: and (d) cooling the temperature of the aqueous mixture to room temperature at which time a desired uniform PH value is reached, (preferably in a range between 6.5-7.0) thereby after cooling, pale blue homogeneous coprecipitates of the superconducting oxides can be obtained.

Accordingly, the primary objective of the present invention is to provide a coprecipitation method for producing powdered superconducting oxides, which overcomes the drawbacks of the conventional coprecipitation method as mentioned above.

Another objective of the present invention is to provide a coprecipitation method by which homogeneous superconducting powders can be obtained in mass production.

These objectives and other features of this invention will become more obvious from the following detailed description of a preferred example in conjunction with illustration tables.

DETAILED DESCRIPTION OF THE INVENTION

Figure 1:
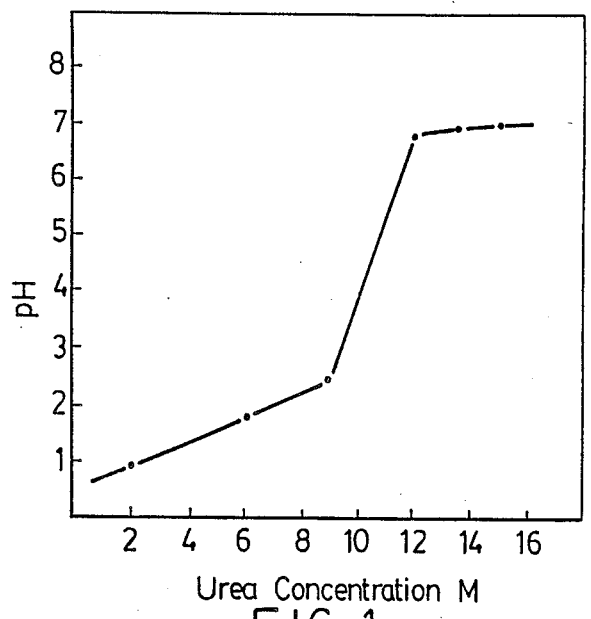
FIG. 1 is a scheme for illustrating the dependence of the urea concentration on the final PH of the solution.

According to this invention, a number of experiments were made by the co-inventors in which, all chemicals used were of high purity grade purchased from Merck AG without further treatment, and deionized water was used throughout all chemical procedures. As examples, 0.5M Oxalic acid and 2 to 15M urea were added into an aqueous mixture containing Y, Ba and Cu salts with molar ratio of 1:2:3 where Y is 0.068M. The aqueous mixture was then heated on an oil bath at temperature range of 90°-100° C. for one hour. Upon the raising of the temperature to 80°-100° C., urea hydrolysis will take place and thus a slow evolution of $CO_2$ and $NH_3$ can be observed. The evolution of $NH_3$ will bring forth a gradual elevation of the PH value of the solution instead of the instaneous changes made by KOH of known skills mentioned previously. In addition, the slow evolution of $CO_2$ constantly stirs the solution and thus effectively prevents particles in the solution from bumping into one another. Therefore, homogeneous fine coprecipitates can be easily obtained. As shown in FIG. 1, the finally attained PH value is dependent on the concentration of urea. In other words, by cooling the solution down to room temperature and/or by controlling the quantity of urea to be added into the solution, a desired uniform PH value of the solution can be obtained.

After cooling, the PH value of the solution was measured so as to get the basic data shown in FIG. 1 which renders a very useful tool to control the PH value in a desirable range by adding urea. In the meantime, pale blue coprecipitates were filtered, washed with water and acetone, and finally dried at 140° C. for 6 hours. The particle size of the dried powders was measured by means of laser scattering with a Coulter Model N4 particle analyzer, and surface area of the powders was measured by BET method at liquid nitrogen temperature with a Quantasorb SD. The results shows a particle size of 0.3 +0.08 m and a surface area of 5.3+0.1 sq.m/g. The dried powders were subject to calcination at 900° C. in air for 16 hours and then were pressed into a number of pellets, having 10 mm diameter and 2 mm thickness, under a pressure of 2 ton per sq.cm. Those pellets were sintered in air at 950° C. for 16 hours and then cooled to room temperature at a speed of 1° C. per minute.

Figure 2:
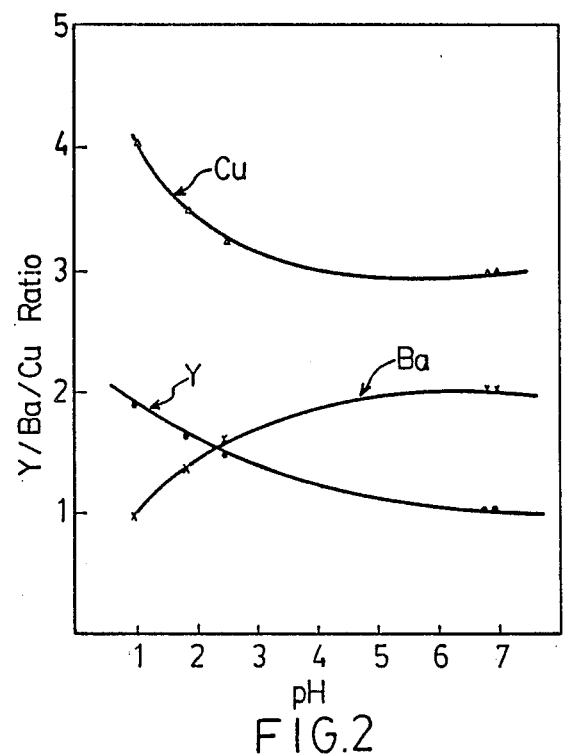
FIG. 2 is a scheme analyzed by EDX for illustrating the relationship between PH value of the solution and the contents of Y, Ba, and Cu in calcined specimens.
Figure 3:
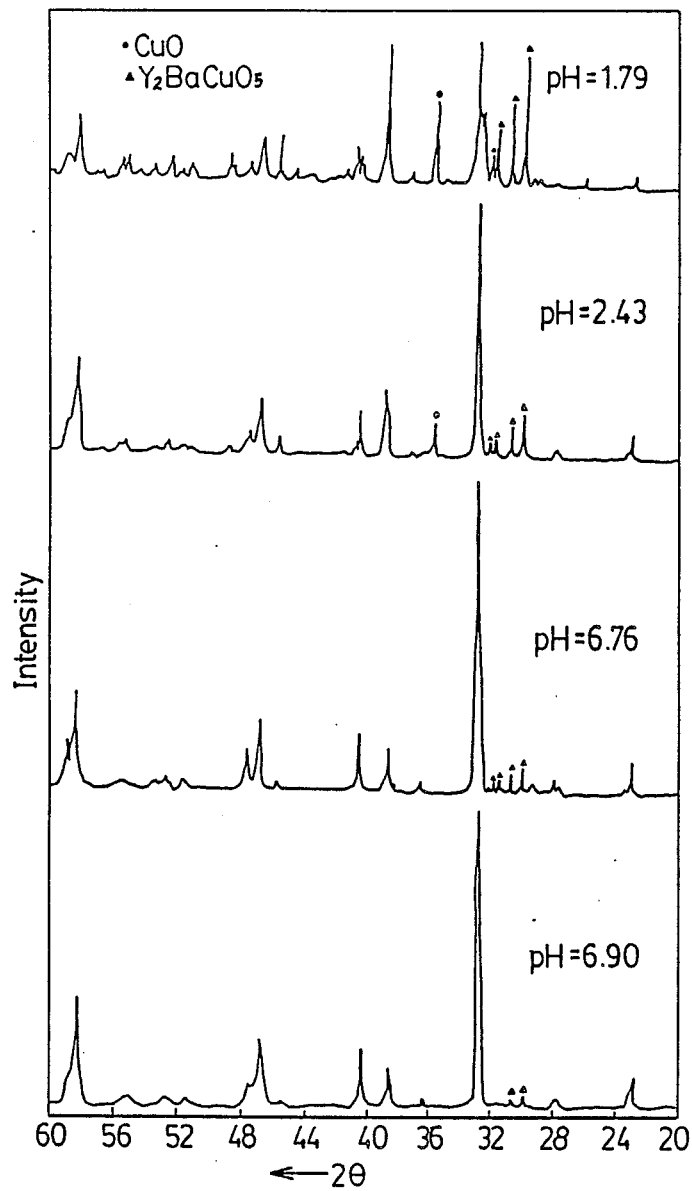
FIG. 3 is a scheme to show XRD patterns of the calcined specimens obtained separately from solutions having different PH values.

The chemical composition analysis of the calcined pellets, as shown in FIG. 2, was examined by Energy Dispersive X-ray (EDX) on a EDAX SW9100. In FIG. 2, it is clearly shown that contents of Y and Cu will increase and the content of Ba will decrease, while the PH value elevates. Therefore, according to the pattern of FIG. 2, in order to obtain the most desirable superconductor in which the stoichometric proportion of Y:Ba:Cu equals 1:2:3, the PH value of the solution should approach 6.9. The X-ray diffraction patterns (Cu-K2) of the calcined specimen and its prepared precursor are shown in FIG. 3. It shows that at lower PH, the precursor is a multiphase powder containing YBa2Cu3O7-x, CuO, Y2BaCuO5 and some other unidentified impurities. As the PH is raised, the pure orthorhombic superconducting phase of Yba2Cu3O7-x increases at the expense of other phases. While the PH value of the solution approaches 6.9, the superconducting specimen is almost identical to that in a perovskite-like structure (Y1Ba2Cu3O7-x) with high purity.

Figure 4:
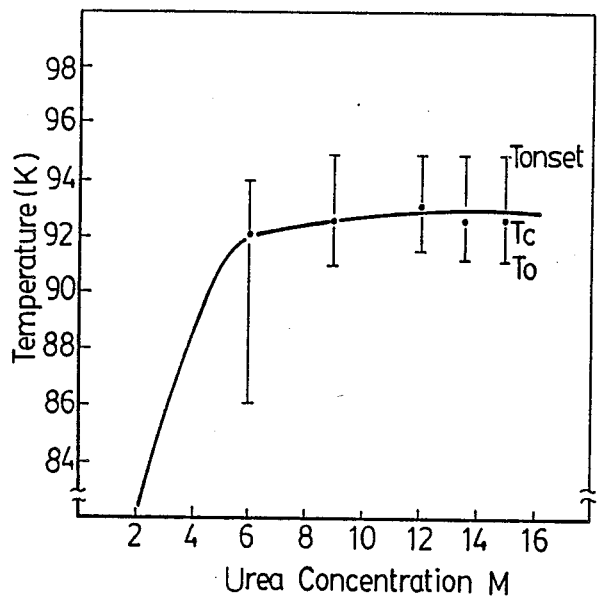
FIG. 4 is a scheme for illustrating the dependence of superconducting temperature on the urea concentration and final PH values from nitrate precursors.
Figure 6:
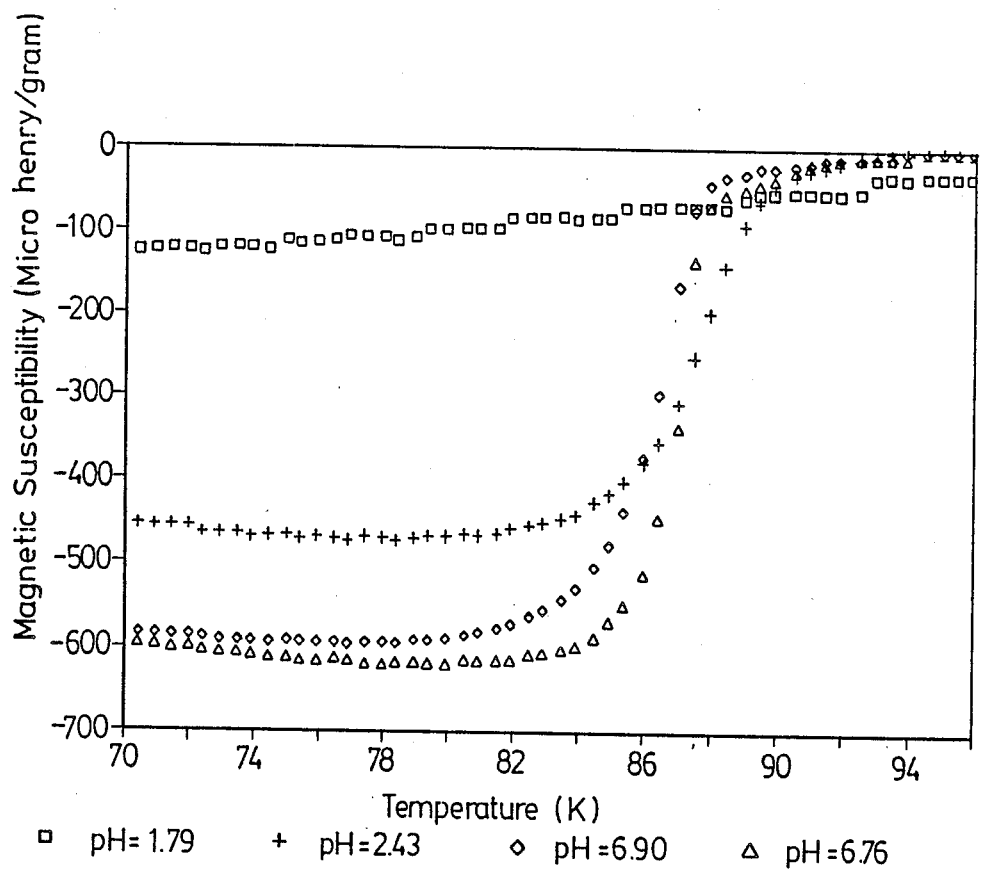
FIG. 6 is a scheme for illustrating the relationship between temperature and the magnetic susceptibility of the specimens obtained from solutions having different PH values.

The superconducting powders obtained according to this invention are subjected to physical measurements including conductivity and magnetic susceptibility, and are shown in FIGS. 4 and 6, respectively, wherein "Tonset" is the superconducting onset temperature; "To" is zero resistance temperature; and "Tc" is the superconducting critical temperature at which the resistance is half of that at the "Tonset". The curve shown in FIG. 4 is obtained by the four-probe method and shows the relationship among the conductivity, temperature, and concentration of urea. In other words, by putting FIG. 1 together with FIG. 4 in a comparison, it should be appreciated that superconducting powders with higher critical temperature (Tc) and smaller $\Delta T$ can be obtained from a mixture having higher PH, i.e. higher concentration of urea. Corresponding measurement of magnetic susceptibility also demonstrates the same trend in that the pronounced diamagnetic character was observed in the specimen from the solution of PH near 6.9 or of urea concentration near 13.5M as shown in FIG. 6. In other words, a higher magnetic susceptibility will be obtained from a PH range between 6.76 and 6.90. While the PH value of the solution is lowered to 6.76, a lower magnetic susceptibility will be obtained.

According to this invention, the superconducting powders obtained from nitrate precursor in optimum condition give "Tonset"=95° K., "Tc"=93° K., "To"=91° K., and "$\Delta T$"=1° K.; and give "Tonset"=95° K., "Tc"=93° K., "To"=88° K., and "$\Delta T$"=2° K. if obtained from chloride precursor. While the "$\Delta T$" is the transition width as a measure of the homogeneity of the specimen.

Figure 5:
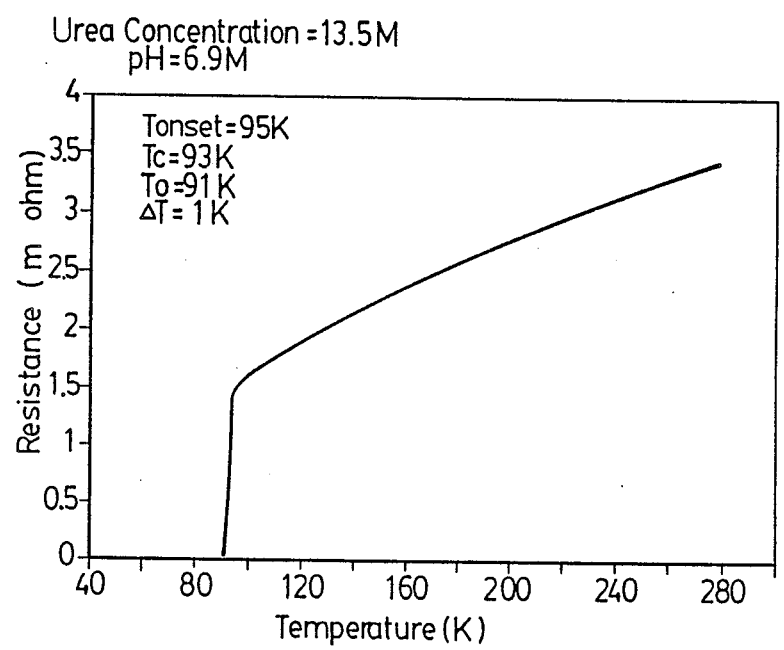
FIG. 5 shows a resistance versus temperature plot for the optimum specimen obtained from a nitrate precursor.

FIG. 5 is a resistance versus temperature plot for the optimum specimen obtained from a nitrate precursor and shows that a large drop in resistance occured in 1° K. which means that the transiton from metal phase into superconducting state will proceed very shortly.

What I claim is:

1. A coprecipitation method for producing homogeneous coprecipitates of superconducting oxides comprising:
    (a) preparing an aqueous mixture containing Y, Ba and Cu salts with a molar ratio of 1:2:3;
    (b) adding 5–10 mole of oxalic acid per mole of Y and 20–250 mole of urea per mole of Y into the aqueous mixture;
    (c) heating the aqueous mixture to a temperature range of 80 to 100 degrees C in order to decompose the urea into $CO_2$ and $NH_3$ based on the following hydrolysis equation:

$$CO(NH_2)_2 + H_2O \rightarrow 2NH_3 + CO_2,$$

such that a pH value of the aqueous mixture will be elevated by the $NH_3$ evoluted from the urea hydrolysis;
    (d) cooling the temperature of the aqueous mixture to room temperature; and
    (e) recovering the homogenous coprecipitates of the superconducting oxides.

2. A coprecipitation method as claimed in claim 1 in which the salts of Y, Ba and Cu are nitrate salts or carbonate salts.

3. A coprecipitation method as claimed in claim 1 in which the PH value of the aqueous mixture is in a range between 6.5 to 7.0.

4. A coprecipitation method as claimed in claim 1 in which the evolution of $CO_2$ gas during the urea hydrolysis constantly stirring the aqueous mixture thereby preventing particles in the aqueous mixture from bumping into each other.

* * * * *